Patented Dec. 25, 1951

2,580,352

UNITED STATES PATENT OFFICE 2,580,352

PREPARATION OF SULFOETHYL ETHERS OF POLYSACCHARIDES

Vernon R. Grassie, Wilmington, Del., assignor to Hercules Powder Company, Wilmington, Del., a corporation of Delaware No Drawing. Application March 31, 1949, Serial No. 84,723

15 Claims. (Cl. 260—231)

This invention relates to the preparation of sulfoethyl polysaccharide ethers and, more particularly, to the addition of vinyl sulfonic acid to cellulose whereby a sulfoethyl cellulose is formed.

Sulfoethyl cellulose is a hydrophilic cellulose derivative having many important uses. Numerous attempts have been made to develop a commercially feasible method of preparing sulfoethyl cellulose, but without success. It has been suggested that it be prepared by reacting alkali cellulose with a sodium β-haloethylsulfonate or ethionic acid or the anhydride thereof. However, the yields obtained are poor, based on the etherifying agent, only a low degree of substitution is obtained, and in every case costly by-products are produced. Attempts have also been made to prepare sulfoethyl cellulose by reacting sodium vinyl sulfonate with alkali cellulose, but to obtain even a low yield and low degree of substitution, it was necessary to use a strong aqueous alkali solution in order to bring about the reaction. Excessive amounts of alkali are required and the reaction is extremely inefficient. Under these reaction conditions the double bond of the vinyl radical is hydrated and, consequently, only a small portion of the vinyl sulfonic acid is available for the etherification reaction.

Now in accordance with this invention it has been found that sulfoethyl ethers of polysaccharides, such as sulfoethyl cellulose, may be prepared by reacting a suspension of an alkali polysaccharide in an inert organic solvent with vinyl sulfonic acid or salts or alkyl esters thereof. This new method is advantageous over the prior art methods in that the higher yields and degree of substitution obtained, low alkali consumption, and the elimination of by-products, make it possible to produce this valuable product on a commercial scale. Many other advantages over the prior art process such as uniformity of product, ease of operation, etc., will be apparent from the following detailed description of the process.

The following examples will illustrate the new process for preparing sulfoethyl polysaccharides in accordance with this invention. All parts and percentages are by weight unless otherwise indicated.

Example 1

Cotton linters ground to 20-mesh size, 36 parts, were suspended in 1000 parts of isopropanol and 133 parts of a 40% aqueous sodium hydroxide solution (6 moles per anhydroglucose unit) were added, the mixture being stirred during the addition and for an additional hour at 75° C. A solution of 49.5 parts of ammonium vinyl sulfonate (1.78 moles per anhydroglucose unit) in 30 parts of water was then added and the reaction allowed to proceed for 3½ hours at 75° C. The cellulose derivative was separated from the organic solvent by filtration and the solids were washed thoroughly with 80% methanol. The white fibers of sulfoethyl cellulose were finally washed with anhydrous methanol and dried at 60° C. in vacuo. A yield of 53.5 parts of sulfoethyl cellulose having a degree of substitution of 0.62 was obtained. This sulfoethyl cellulose was completely soluble in water and in aqueous alkali giving viscous, colorless, fiber-free solutions.

Example 2

Purified wood pulp ground to 20-mesh size, 16.7 parts, was suspended in 500 parts of isopropanol and treated with 67.2 parts of a 30% aqueous sodium hydroxide solution (4.89 moles per anhydroglucose unit). The slurry was stirred and heated at 70° C. for one hour. Sodium vinyl sulfonate in the solid form, 43.6 parts (3.26 moles per anhydroglucose unit) was added to the mixture over a period of 15 minutes. After one hour, with the temperature at 70° C., 200 parts of water was added and the reaction was allowed to proceed for an additional three hours at 70° C. The product was then isolated and purified as described in Example 1. The sulfoethyl cellulose so obtained was in the form of white fibers, amounted to 30.5 parts, and had a degree of substitution of 1.03.

Example 3

Three parts of cotton linters (20 mesh) was suspended in 100 parts of dioxane and treated with 16.7 parts of a 40% aqueous sodium hydroxide solution (9 moles per anhydroglucose unit). The mixture was agitated and heated at 75° C. for one hour after which 2.31 parts of ammonium vinyl sulfonate (1.0 mole per anhydroglucose unit) was added. Heating at 75° C. was continued for an additional four hours. The sulfoethyl cellulose was isolated and purified as described in Example 1. A yield of 3.94 parts was obtained. This sulfoethyl cellulose had a degree of substitution of 0.37 and was highly soluble in both water and dilute aqueous alkali.

Example 4

Three parts of cotton linters (20 mesh) was suspended in 80 parts of tert-butanol and the resulting slurry was treated with 19.4 parts of a 48.5% aqueous potassium hydroxide solution (9 molecular equivalents of alkali per anhydroglucose unit). The mixture was heated for one hour at 70° C. after which 4.72 parts of solid ammonium vinyl sulfonate (2.04 molecular equivalents per anhydroglucose unit) was added. Heating was continued at 70° C. for an additional four hours and the product was isolated and purified as described in Example 1. A yield of 4.08 parts of white fibrous sulfoethyl cellulose was obtained. This material had a degree of substitution of 0.40 and was soluble in both water and dilute aqueous alkali.

*Example 5*

Five parts of purified wood pulp (20 mesh) was thoroughly macerated with 24.6 parts of a 30% aqueous sodium hydroxide solution (6 moles per anhydroglucose unit). The crumbs of alkali cellulose so formed were then suspended in 100 parts of isopropanol. The slurry was agitated and heated at 70° C. for one hour. To this mixture was added a solution of 6.65 parts of vinyl sulfonic acid (2 moles per anhydroglucose unit) in 20 parts of isopropanol. Heating was continued for an additional three hours at 700° C. The product was isolated and purified as described in Example 1. A yield of 7.5 parts of white fibers having a degree of substitution of 0.62 was obtained. This product was soluble in both water and dilute aqueous alkali.

*Example 6*

One hundred parts of cotton linters (20 mesh) was suspended in 2800 parts of isopropanol and treated with 308 parts of a 40% aqueous sodium hydroxide solution (5 moles per anhydroglucose unit). The slurry was agitated and heated at 70° C. for one hour. A solution of 38.5 parts of ammonium vinyl sulfonate (0.5 mole per anhydroglucose unit) in 200 parts of water was added and heating at 75° C. was continued for four hours. The fibrous product was isolated and purified as described in Example 1. A yield of 111 parts was obtained. This sulfoethyl cellulose had a degree of substitution of 0.21 and was soluble in dilute alkali.

*Example 7*

Ten parts of cotton linters (20 mesh) was treated with 25 parts of a 36% aqueous sodium hydroxide solution (3.58 moles per anhydroglucose unit). The alkali cellulose so formed was refluxed in dry dioxane for one-half hour after which 35 parts of n-propyl vinyl sulfonate (3.0 moles per anhydroglucose unit) was added and the reaction mixture was agitated and heated at 105° C. for four hours. The sulfoethyl cellulose so obtained was separated from the liquid medium by filtration and washed with methanol, acetone, and finally hexane. It was found to contain 0.175 sulfoethyl group per glucose unit, was slightly soluble in water and soluble in dilute alkali.

*Example 8*

Five parts of a purified corn starch was suspended in 80 parts of isopropanol and treated with 18.5 parts of a 40% aqueous sodium hydroxide solution (6 moles per anhydroglucose unit). The slurry was heated for one hour at 70° C. and then 3.85 parts of solid ammonium vinyl sulfonate (1.0 mole per anhydroglucose unit) was added. The slurry was agitated and heating at 70° C. was continued for five hours. The product was separated from the organic solvent by filtration, washed with 80% methanol and then with anhydrous methanol and finally was dried at 60° C. in vacuo. A yield of 6.04 parts of the sulfoethyl ether of starch having a degree of substitution of 0.48 was obtained. The product was a white powder which was soluble in water and in dilute aqueous alkali yielding viscous solutions.

The product prepared by the above procedures relating to cellulosic materials is in the form of the alkali salt of the sulfoethyl cellulose. If the free acid is desired, it may be acidified by the addition of a mineral acid. The free acid form of sulfoethyl cellulose is a white, finely fibrous material, which at substitutions of 0.2 and above is markedly hydrophilic. It has the same solubility characteristics as the alkali salts of the sulfoethyl cellulose. The following example illustrates the preparation of the free acid form of sulfoethyl cellulose.

*Example 9*

One part of sodium sulfoethyl cellulose was agitated for five hours at room temperature in 20 parts of 75% aqueous methanol containing two parts of concentrated hydrochloric acid. The acid liquor was then drained off and the resultant free acid form of sulfoethyl cellulose was washed with 70% methanol, then with anhydrous methanol and finally was dried in vacuo at room temperature. It was soluble in both water and dilute alkali.

In accordance with this invention, sulfoethyl ethers of polysaccharides may be prepared by the addition of vinyl sulfonic acid to the polysaccharide in an inert organic solvent medium and in the presence of an alkaline reagent. The reaction, using cellulose as a typical polysaccharide, may be represented as follows:

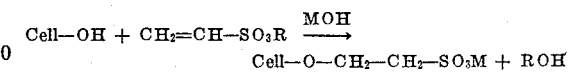

$$\text{Cell—OH} + \text{CH}_2=\text{CH—SO}_3\text{R} \xrightarrow{\text{MOH}} \text{Cell—O—CH}_2\text{—CH}_2\text{—SO}_3\text{M} + \text{ROH}$$

where Cell—OH represents an etherifiable hydroxyl group of cellulose, R is hydrogen, alkali metal, ammonium, or alkyl, and MOH is a strongly alkaline hydroxide.

This sulfoethylation reaction will proceed readily with any polysaccharide as, for example, cellulose or partially substituted cellulose, starch, glycosides, cellodextrins, pectic substances, etc., and will impart water and alkali solubility to polysaccharides which, prior to sulfoethylation, do not possess these solubility characteristics.

Any form of vinyl sulfonic acid may be used in carrying out the etherification reaction in accordance with this invention. For example, vinyl sulfonic acid itself may be used or a salt thereof such as the alkali metal salts, ammonium salt, quaternary ammonium salt, etc., or an alkyl ester of vinyl sulfonic acid such as the methyl, ethyl, etc. esters may be used. In the latter case the ester group is hydrolyzed in the presence of the alkali, and alcohol is obtained as a by-product. The vinyl sulfonate may be added as such, in solid form in the case of the salts, or liquid form in the case of the free acid or esters thereof, or it may be added as a solution in water or in some other solvent. If it is added in the form of an aqueous solution, the volume of water used should be such that the amount of water in the reaction mixture does not exceed about 15% of the total liquid phase and preferably amounts to not more than about 7 to 12% of the liquid phase.

The amount of vinyl sulfonate (free acid or salt) to be added to the polysaccharide material is dependent upon the degree of etherification desired in the final product. Usually, to obtain a water- and alkali-soluble sulfoethyl ether of a polysaccharide from about 0.5 to about 2.0 molecular equivalents of the vinyl sulfonate are added per etherifiable hydroxyl group in the polysaccharide. Larger amounts may be used, if desired, without any disadvantageous result. However, when lesser amounts are used, the final product may not be sufficiently etherified to produce the water- and alkali-soluble characteristics which are desired.

The reaction between the polysaccharide, as, for example, cellulose and the vinyl sulfonic acid takes place in the presence of an alkaline reagent. Any strongly alkaline hydroxide such as, for example, the alkali metal hydroxides such as sodium or potassium hydroxide, or the quaternary ammonium hydroxides such as trimethylbenzyl ammonium hydroxide, etc. may be used. The alkaline reagents are believed to serve two purposes in the sulfoethylation reaction; to swell and disperse the cellulose or other polysaccharide, thus activating it, and to catalyze the vinyl sulfonate addition.

Any mode of introducing the alkaline reagent in the reaction mixture may be utilized. The cellulose or polysaccharide may be converted to an alkali cellulose or polysaccharide by suspending it in an organic solvent and treating the slurry with an aqueous solution of from 20 to 80% concentration of the alkaline reagent. In this alkali cellulose preparation, the amount of alkaline reagent added is adjusted to approximately 4 to 5.5 molecular equivalents per anhydroglucose unit, when an alkali salt of the vinyl sulfonic acid is to be used. However, when free vinyl sulfonic acid, ammonium vinyl sulfonate, or an alkyl vinyl sulfonate is to be used, the alkali proportion is increased by an amount sufficient to form the alkali salt of the free acid. The reaction proceeds favorably with higher proportions of alkali, but to prevent side reactions such as the hydration of the vinyl double bond, the alkali concentration is preferably within the range of 4 to 5.5 molecular equivalents. The mixture of cellulose, or cellulose derivative, or other polysaccharide, organic solvent and alkaline reagent is then agitated and heated for one hour at 50° C. or above or it may be simply agitated at room temperature. An alternative method of alkali-polysaccharide formation consists of pretreating the carbohydrate material with an aqueous alkaline reagent and then suspending the crumbs so formed in an organic solvent before the sulfoethylation reaction. Substantially the same results are obtained by this procedure.

By alkali cellulose or other polysaccharide as used in this specification and appended claims is meant the alkali metal salts and ammonium salts as, for example, the quaternary ammonium salts of the carbohydrate.

The reaction between the alkali cellulose, or other polysaccharide, and the vinyl sulfonic acid in accordance with this invention is carried out in the presence of an organic solvent. Any organic solvent may be used as the medium for the sulfoethylation reaction, provided that it is inert under the reaction conditions, i. e., does not react with the vinyl sulfonate. The main functions of the organic solvent are to serve as a heat transfer medium, and as a dispersing or insolubilizing agent so that the hydrophilic derivative will remain in a finely fibrous condition. Suitable organic solvents which may be used for the reaction are dioxane, isopropanol, tertiary butanol, tetrahydrofuran, ethylene glycol diethyl ether, etc. Best results are obtained with organic solvents that are water soluble such as isopropanol, dioxane, etc. In these media water cannot accumulate in the cellulose derivative phase of the reaction mixture. However, the sulfoethylation reaction may be satisfactorily carried out in such water-insoluble organic solvents as benzene, toluene, etc. The polysaccharide may be suspended in the solvent before the treatment with the alkaline reagent, or the alkali cellulose may be prepared and then suspended in the solvent. The amount of solvent used is determined by the type of agitation available for the heterogeneous reaction, since mixing becomes increasingly difficult with increasing cellulose proportions, and also depends upon the form of cellulose used; i. e., the state of subdivision. In general, with ground cotton linters, a cellulose to solvent ratio of about 1:9 to about 1:25 is used and with unground linters, a ratio of about 1:25 to about 1:50 is used.

The reaction in accordance with this invention is carried out at a temperature of from about 50° to about 110° C. and preferably at a temperature of about 65° to about 90° C. If the particular solvent being used as the diluent in the reaction possesses a boiling point below this temperature range, the reaction may be carried out under pressure as in an autoclave. The temperature of the suspension of alkali cellulose in organic solvent is preferably adjusted to the reaction temperature prior to the vinyl sulfonate addition. Following the vinyl sulfonate addition, the reaction is allowed to proceed at the specified temperature for from 1 to 6 hours and preferably from about 2½ to 4 hours. Longer reaction times may be used but it is believed that no advantages are realized from reaction times of greater than 6 hours and, in fact, above about 12 hours' reaction time, depolymerization and de-etherification begin to be noticeable. The sulfoethylation reaction may take place in less than one hour but usually such a reaction is not efficient on the basis of vinyl sulfonate utilization.

The sulfoethyl cellulose when prepared in accordance with this invention is readily isolated from the reaction mixture by filtration or any other convenient means of separating the liquid from the fibrous product. It may then be purified by washing the fibrous product to remove alkali and any unreacted vinyl sulfonate. Any convenient solvent for this washing operation may be used, which solvent will not dissolve the sulfoethyl cellulose but which will dissolve the vinyl sulfonate salts and alkali. An aqueous methanol solution such as 80% methanol has been found to be an excellent material for carrying out this washing operation. If the free acid form of the sulfoethyl cellulose is desired rather than the alkali salt, the alkali salt of the sulfoethyl cellulose may be suspended in a convenient liquid diluent such as methanol, and acidified by the addition of a mineral acid. The fibrous acid form of the sulfoethyl cellulose may then be washed as in the case of the alkali salt. The fibers of sulfoethyl cellulose or alkali salt of sulfoethyl cellulose may then be dried by any desirable means.

The process of preparing sulfoethyl polysaccharides by reacting a suspension of an alkali polysaccharide in an inert organic solvent with vinyl sulfonic acid in accordance with this invention makes possible the commercial production of the sulfoethyl ethers of polysaccharides.

The new process is an efficient one resulting in high yields and the alkali requirements are low in comparison with the prior art processes. The vinyl sulfonic acid reagent is more readily and intimately mixed with the alkali cellulose or other polysaccharide resulting in a more homogeneous product. Furthermore, the difficult precipitation step necessary to isolate the product is eliminated since the product retains its fibrous physical form. Thus, the new process in accordance with this invention is an economical process which yields a superior product.

What I claim and desire to protect by Letters Patent is:

1. The process of preparing a sulfoethyl ether of a polysaccharide which comprises heating a suspension of an alkali polysaccharide in an inert organic solvent with one of the group consisting of vinyl sulfonic acid, salts and alkyl esters thereof to a temperature of from about 50° C. to about 110° C.

2. The process of preparing a sulfoethyl ether of a polysaccharide which comprises reacting the polysaccharide with an aqueous solution of a strongly basic hydroxide and then heating a suspension of the alkali polysaccharide in an inert organic solvent with one of the group consisting of vinyl sulfonic acid, salts and alkyl esters thereof to a temperature of from about 50° C. to about 110° C.

3. The process of preparing a sulfoethyl ether of cellulose which comprises heating a suspension of an alkali cellulose in an inert organic solvent with one of the group consisting of vinyl sulfonic acid, salts and alkyl esters thereof to a temperature of from about 50° C. to about 110° C.

4. The process of preparing a sulfoethyl ether of cellulose which comprises reacting the cellulose with an aqueous solution of a strongly basic hydroxide and then heating a suspension of the alkali cellulose in an inert organic solvent with one of the group consisting of vinyl sulfonic acid, salts and alkyl esters thereof to a temperature of from about 50° C. to about 110° C.

5. The process of preparing a sulfoethyl ether of cellulose which comprises reacting the cellulose with an aqueous solution of a strongly basic hydroxide and then heating suspension of the alkali cellulose in an inert organic solvent with vinyl sulfonic acid to a temperature of from about 50° C. to about 110° C.

6. The process of preparing a sulfoethyl ether of cellulose which comprises reacting the cellulose with an aqueous solution of a strongly basic hydroxide and then heating a suspension of the alkali cellulose in an inert organic solvent with an alkyl ester of vinyl sulfonic acid to a temperature of from about 50° C. to about 110° C.

7. The process of preparing a sulfoethyl ether of cellulose which comprises reacting the cellulose with an aqueous solution of a strongly basic hydroxide and then heating a suspension of the alkali cellulose in an inert organic solvent with a salt of vinyl sulfonic acid.

8. The process of preparing a sulfoethyl ether of cellulose which comprises heating a suspension of an alkali cellulose in an inert organic solvent with vinyl sulfonic acid to a temperature of from about 50° C. to about 110° C.

9. The process of preparing a sulfoethyl ether of cellulose which comprises heating a suspension of an alkali cellulose in an inert organic solvent with an alkyl ester of vinyl sulfonic acid to a temperature of from about 50° C. to about 110° C.

10. The process of preparing a sulfoethyl ether of cellulose which comprises heating a suspension of an alkali cellulose in an inert organic solvent with a salt of vinyl sulfonic acid to a temperature of from about 50° C. to about 110° C.

11. The process of preparing a sulfoethyl ether of cellulose which comprises heating a suspension of an alkali cellulose in an inert organic solvent with an alkali metal salt of vinyl sulfonic acid to a temperature of from about 50° C. to about 110° C.

12. The process of preparing a sulfoethyl ether of cellulose which comprises heating a suspension of an alkali cellulose in an inert organic solvent with ammonium vinyl sulfonate to a temperature of from about 50° C. to about 110° C.

13. The process of preparing a sulfoethyl ether of cellulose which comprises heating a suspension of an alkali cellulose in an inert organic solvent with vinyl sulfonic acid to a temperature of from about 65° C. to about 90° C.

14. The process of preparing a sulfoethyl ether of cellulose which comprises heating a suspension of an alkali cellulose in an inert organic solvent with ammonium vinyl sulfonate to a temperature of from about 65° C. to about 90° C.

15. The process of preparing a sulfoethyl ether of cellulose which comprises heating a suspension of an alkali cellulose in an inert organic solvent with an alkali metal salt of vinyl sulfonic acid to a temperature of from about 65° C. to about 90° C.

VERNON R. GRASSIE.

REFERENCES CITED

The following references are of record in the file of this patent:

UNITED STATES PATENTS

| Number | Name | Date |
|---|---|---|
| 2,098,335 | Dreyfus | Nov. 9, 1937 |
| 2,132,181 | Neugebauer et al. | Oct. 4, 1938 |
| 2,148,554 | Hentrich et al. | Feb. 28, 1939 |
| 2,422,000 | Dickey et al. | June 10, 1947 |
| 2,517,577 | Klug et al. | Aug. 8, 1950 |

FOREIGN PATENTS

| Number | Country | Date |
|---|---|---|
| 117,056 | Austria | July 20, 1927 |
| 545,812 | Great Britain | June 15, 1942 |